United States Patent
Li et al.

(10) Patent No.: US 8,453,667 B2
(45) Date of Patent: Jun. 4, 2013

(54) CLEANING WATER SUPPLY DEVICE

(75) Inventors: Libo Li, Guangdong Pr (CN); Jinming Xie, Guangdong Pr (CN); Mengfeng Cheng, Taichung (TW); Changweng Zhang, Guangdong Pr (CN)

(73) Assignee: Globe Union Industrial Corp., Taichung (TW)

( * ) Notice: Subject to any disclaimer, the term of this patent is extended or adjusted under 35 U.S.C. 154(b) by 170 days.

(21) Appl. No.: 13/048,872

(22) Filed: Mar. 16, 2011

(65) Prior Publication Data

US 2012/0080109 A1  Apr. 5, 2012

Related U.S. Application Data

(63) Continuation-in-part of application No. 12/896,571, filed on Oct. 1, 2010.

(51) Int. Cl.
*G05D 11/00* (2006.01)

(52) U.S. Cl.
USPC ............ 137/101.11; 137/205.5; 137/603; 137/625.4; 137/860; 137/896; 137/895

(58) Field of Classification Search
USPC ............ 137/154, 205.5, 602, 603, 625.4, 137/843, 860, 888, 895, 896, 87.01, 88, 101.11; 222/145.1; 239/311, 318, 327, 571; 251/286–288
See application file for complete search history.

(56) References Cited

U.S. PATENT DOCUMENTS

| | | | | |
|---|---|---|---|---|
| 2,672,366 | A | * | 3/1954 | Deport ........................ 239/310 |
| 3,797,747 | A | * | 3/1974 | Buzzi et al. .................. 239/311 |
| 4,073,314 | A | * | 2/1978 | Speelman et al. ........ 137/625.47 |
| 4,177,835 | A | * | 12/1979 | Paley ............................ 137/883 |
| 4,200,206 | A | * | 4/1980 | Chase et al. ................ 222/144.5 |
| 4,432,105 | A | * | 2/1984 | Pitroda ......................... 239/303 |
| 4,623,095 | A | * | 11/1986 | Pronk ........................... 239/311 |
| 5,678,592 | A | * | 10/1997 | Boticki et al. ................ 137/216 |
| 6,607,008 | B1 | * | 8/2003 | Yoshimoto et al. ...... 137/624.13 |
| 7,320,438 | B1 | * | 1/2008 | Latin et al. .................... 239/310 |
| 2004/0173271 | A1 | * | 9/2004 | Nance .......................... 137/895 |
| 2005/0173336 | A1 | * | 8/2005 | Arnaud ....................... 210/512.1 |
| 2007/0204392 | A1 | * | 9/2007 | Lo .................................. 4/354 |

* cited by examiner

*Primary Examiner* — Craig Schneider
*Assistant Examiner* — Jessica Cahill

(57) ABSTRACT

A cleaning water supply device contains a mixing unit including a channel assembly and a circular valve member, wherein the channel assembly includes an inlet channel, an outlet channel, a through channel between the inlet and the outlet channels, and at least one intake communicating with the through channel; the valve member is installed in the through channel and includes a flexibly circular wing formed therein to abut against and close the through channel so that the intake is stopped communicating with the inlet channel and the outlet channel, and when the vacuum attraction generates in the through channel, the inlet and the outlet channels are opened; a storing unit connected with the channel assembly of the mixing unit and including a chamber to receive a cleaning fluid and an output tunnel communicating with the chamber and the intake.

16 Claims, 15 Drawing Sheets

CLEANING WATER SUPPLY DEVICE

This application is a Continuation-in-Part of application Ser. No 12/896,571, filed Oct. 1, 2010.

BACKGROUND OF THE INVENTION

1. Field of the Invention

The present invention relates to a cleaning water supply device that generates a vacuum attraction to draw a cleaning fluid into a water flow so that the cleaning fluid and the water flow mix together quickly and evenly, thus obtaining cleaning water.

2. Description of the Prior Art

A conventional cleaning water supply device is installed on the showering equipment and comprises a channel with a decreased and then increased diameter disposed adjacent to an outlet and an intake in the channel to flow water, wherein a vacuum attraction generates in the intake so that the cleaning fluid in the store box is drawn into the channel via the intake to mix with the water, thereby spraying cleaning water out of the outlet.

However, such a conventional cleaning water supply device still has the following defects:

1. When the showering equipment is adjusted in a water splash mode, the pressure changes easily, so that the water or the cleaning water will flow back to the store box from the intake, thus polluting the cleaning fluid and jamming the intake by impurities in the water.

2. If water becomes lower, the cleaning fluid can not be drawn, hence the cleaning fluid can not be mixed.

3. A size of the intake is fixed, therefore an output quantity of the cleaning fluid will not increase with the water pressure, such a cleaning fluid with a low mixing ratio will influence the quantity of the cleaning water.

4. The intake only has a single opening, so the cleaning fluid can only flow into the channel from the single opening without mixing with the water quickly and evenly.

The present invention has arisen to mitigate and/or obviate the afore-described disadvantages.

SUMMARY OF THE INVENTION

The primary objective of the present invention is to provide a cleaning water supply device that is capable of overcoming above-mentioned shortcoming.

The secondary objective of the present invention is to provide a cleaning water supply device that a vacuum attraction generates on the connection of the inlet and the outlet channels, hence the wing of the valve member is retracted inward flexibly by the vacuum attraction to open and guide the through channel, such that the output tunnel of the storing unit is turned on by using the control unit to draw the cleaning fluid of the chamber into the connection of the inlet and the outlet channels via the output tunnel, the intake, and the through channel so that the cleaning fluid mixes with the water flow automatically, thereby obtaining the cleaning water.

A further objective of the present invention is to provide a cleaning water supply device that due to the open cross-section area of the through channel is adjusted with a change of the water pressure, when the water pressure decreases to lower the open cross-section area, the cleaning fluid is outputted decreasingly, while the water pressure increases to enhance the open cross-section area, the cleaning fluid is outputted increasingly so that the cleaning fluid and the water flow are mixed together within a certain range, thus achieving a suitable concentration of the cleaning water.

Another further objective of the present invention is to provide a cleaning water supply device that partial cleaning fluid flows into the annular space of the through channel from one of the second holes, and another partial cleaning fluid flows into the annular space of the through channel from the other three second holes along the path in turn so that the cleaning fluid flows into the annular space completely to mix with the water flow quickly and evenly.

Also another further objective of the present invention is to provide a cleaning water supply device of which the mixing unit is installed on the showering equipment which is adjusted in a water splash mode, wherein the water pressure is changed to generate a back pressure in internal pipes of the showering equipment, and then a circular wing of a circular valve member senses the back pressure to further close a through channel automatically so that a water flow or the cleaning fluid is stopped to flow back to the output tunnel and a chamber, thus preventing the cleaning fluid from being contaminated. Likewise, impurities in the water are stopped to flow into the through channel or an intake, thus preventing the through channel or the intake from being jammed by the impurities.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
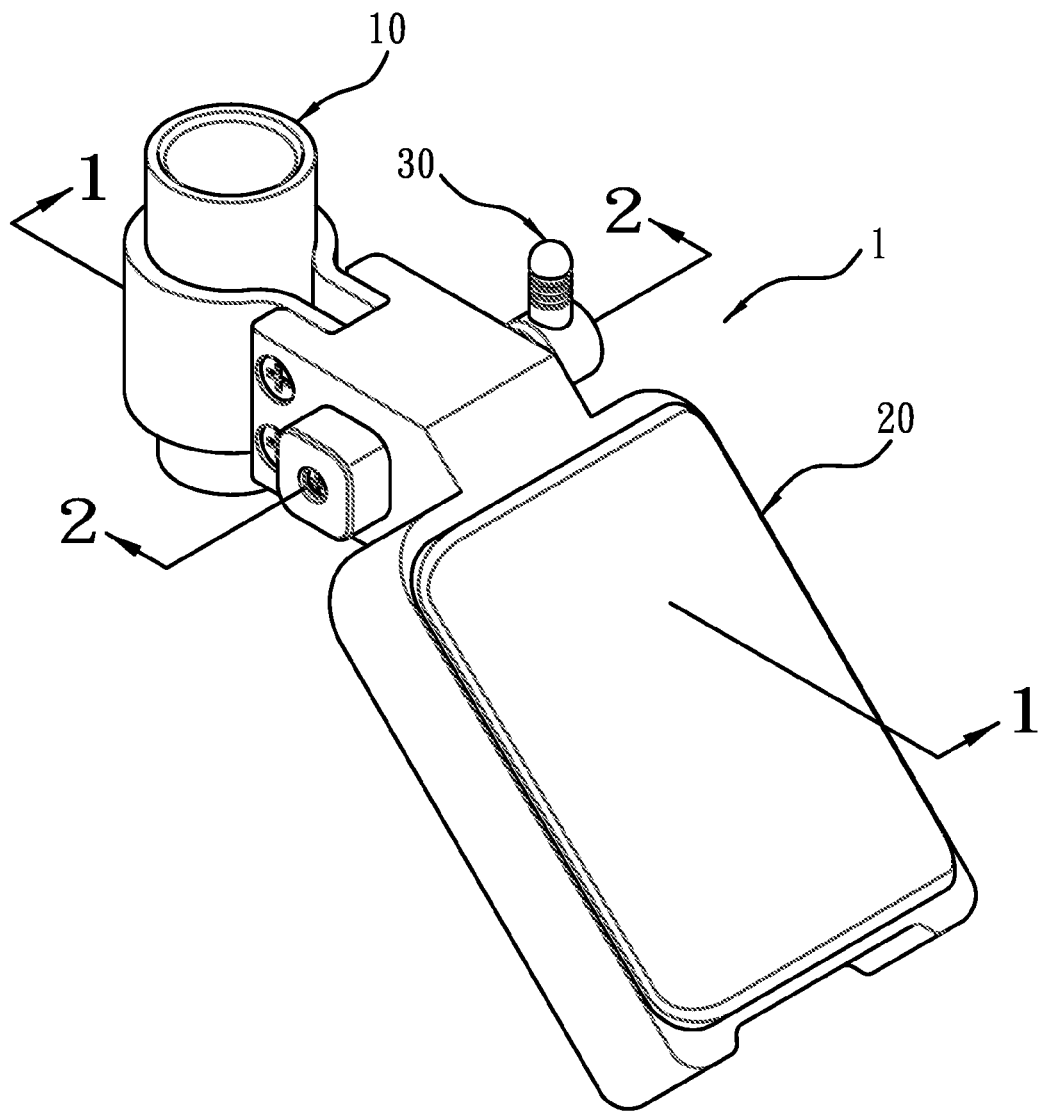
FIG. 1 is a perspective view showing the assembly of a cleaning water supply device in accordance with a first embodiment of the present invention.
Figure 2:
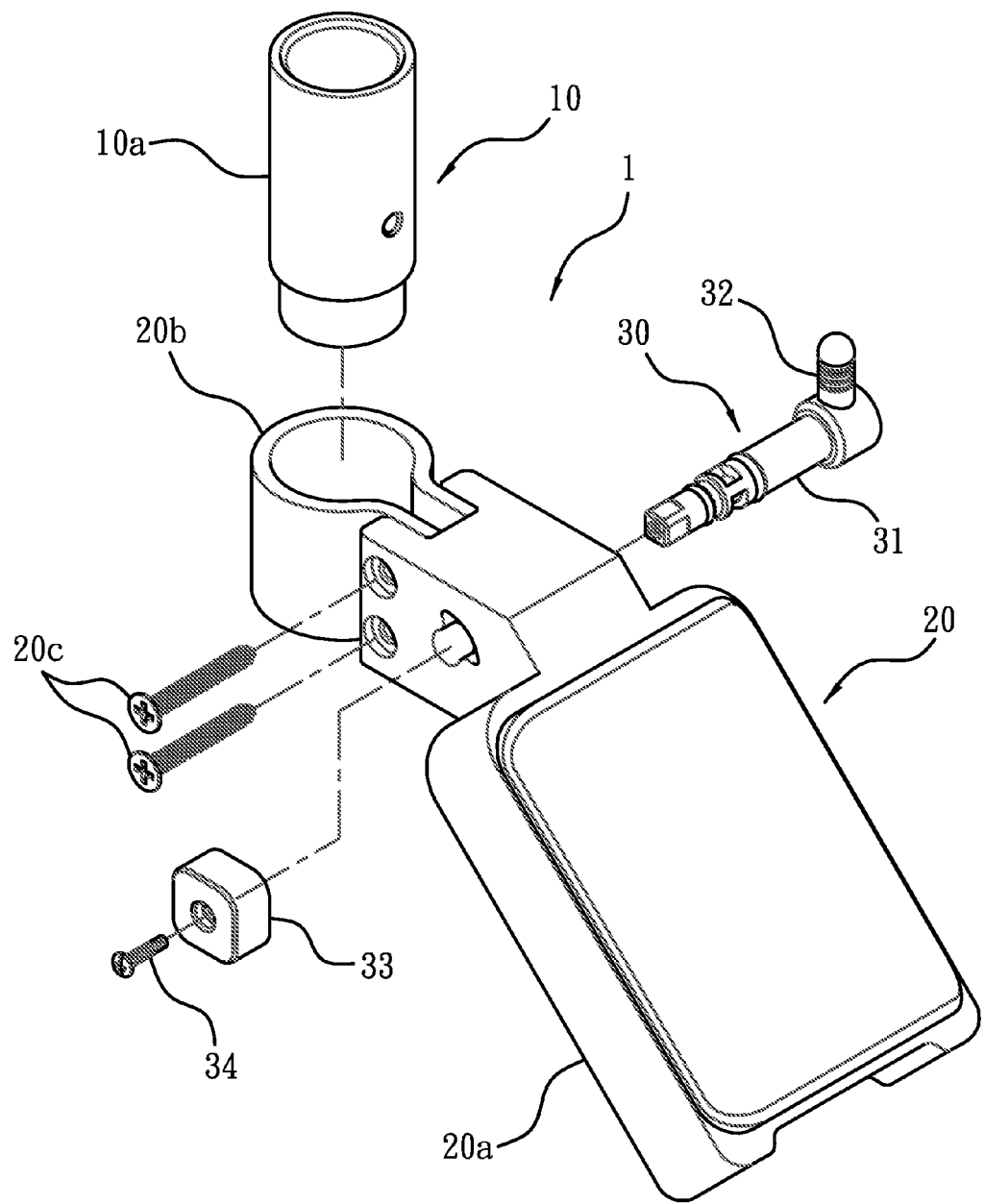
FIG. 2 is a perspective view showing the exploded components of most part of the cleaning water supply device in accordance with the first embodiment of the present invention.
Figure 3:
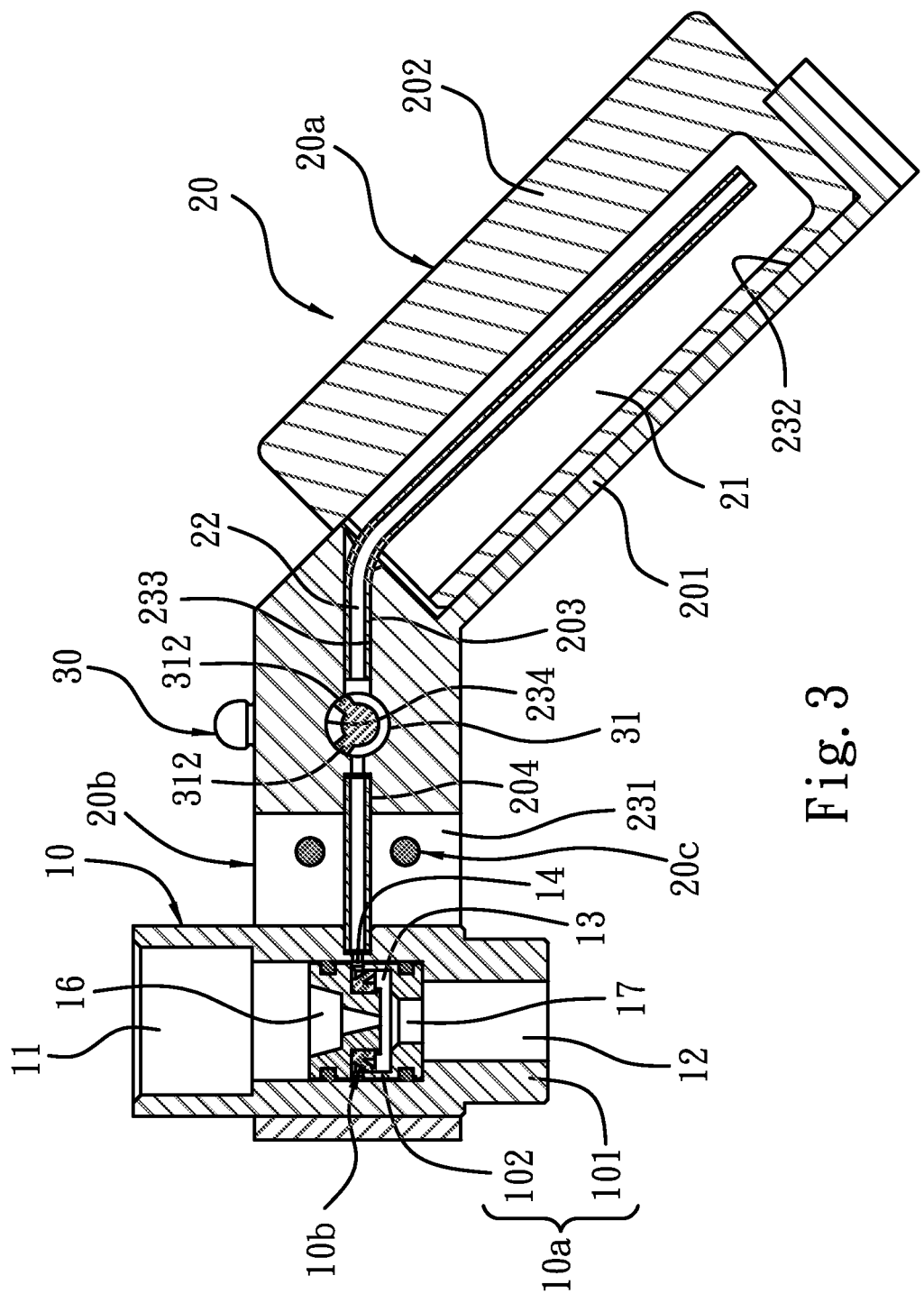
FIG. 3 is a cross-sectional view taken along the line 1-1 of FIG. 1.

Referring to the drawings and initially to FIGS. 1-3, a cleaning water supply device 1 in accordance with a first embodiment of the present invention comprises a mixing unit 10, a storing unit 20, and a control unit 30.

Figure 4:
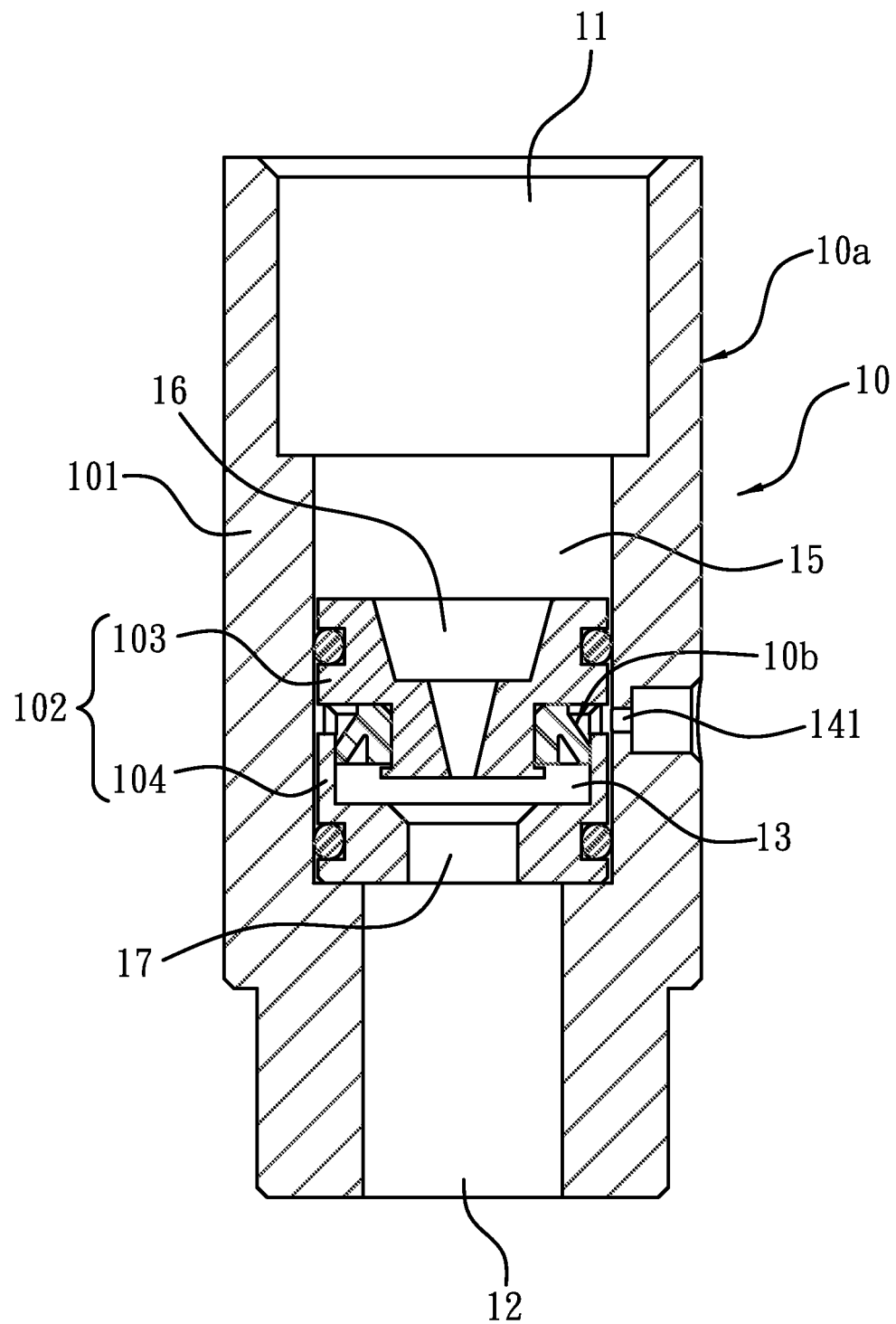
FIG. 4 is a cross-sectional view showing the assembly of a mixing unit of the cleaning water supply device in accordance with the first embodiment of the present invention.
Figure 5:
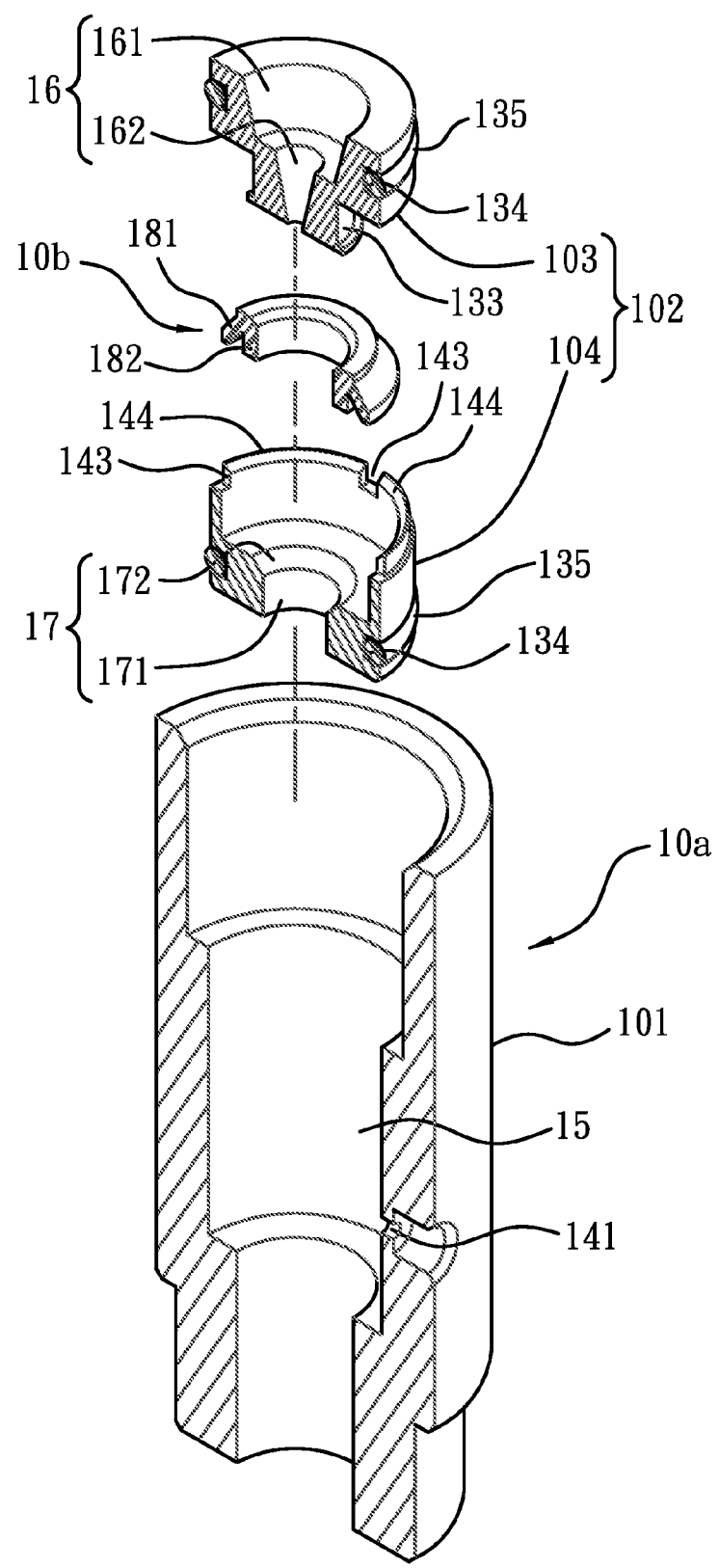
FIG. 5 is a cross-sectional perspective view showing the exploded components of the mixing unit of the cleaning water supply device in accordance with the first embodiment of the present invention.
Figure 6:
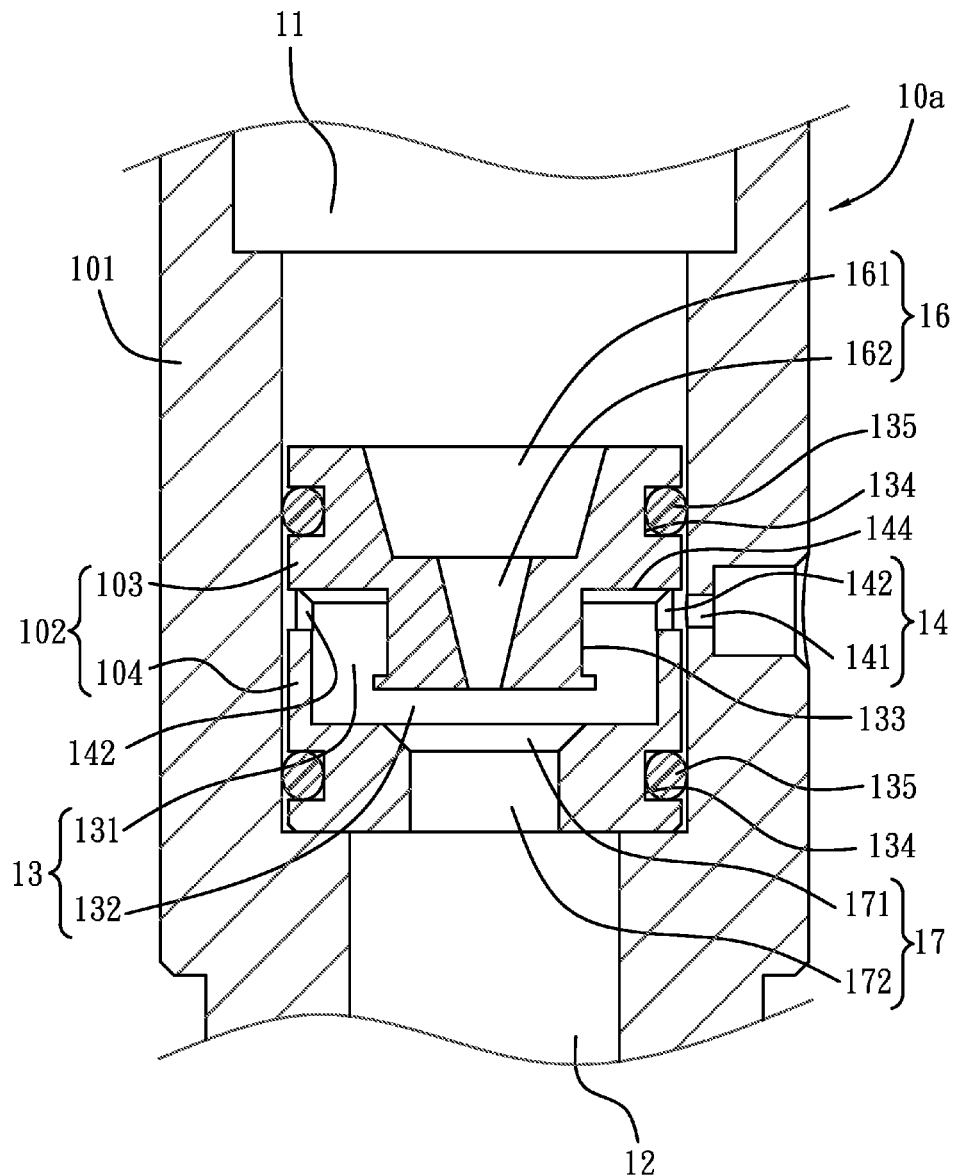
FIG. 6 is a cross-sectional view showing the assembly of a channel assembly of the cleaning water supply device in accordance with the first embodiment of the present invention.

The mixing unit 10, as shown in FIGS. 4 and 5, includes a channel assembly 10a and a circular valve member 10b, wherein the channel assembly 10a, as illustrated in FIG. 6, includes an inlet channel 11, an outlet channel 12, a through channel 13 between the inlet and the outlet channels 11, 12, and at least one intake 14 communicating with the through channel 13. In this embodiment, there are four intakes 14 provided in an equiangular arrangement.

The channel assembly 10a includes a body 101 and a plug member 102 as shown in FIGS. 5 and 6, wherein the body 101 is provided to define one part of the inlet channel 11, one part of the outlet channel 12, and at least one first hole 141 radially passing through a peripheral wall of of the body 101 to define one part of the intake 14 and a first groove 15.

The plug member 102 is installed in the first groove 15 of the body 101 to define the through channel 13, one part of the inlet channel 11, one part of the outlet channel 12, and at least one second hole 142, the second hole 142 and the first holes 141 are combined to define the intake 14.

The plug member 102 includes a first plug 103 and a second plug 104, both of which are fixed in the first groove 15 of the body 101; the first plug 103 includes a first bore 16 axially passing therethrough to define one part of the inlet channel 11; the second plug 104 includes a second bore 17 axially passing therethrough to define one part of the outlet channel 12 and at lease one recess 143 formed on a peripheral top surface thereof, there are four recesses 143 provided in an equiangular arrangement to define one parts of the intakes 14 with a bottom peripheral surface of the first plug 103 (i.e. the second holes 142); between the first plug 103 and the second plug 104 is defined the through channel 13 which includes an annular space 131 and a connecting space 132 located at a bottom end of the annular space 131, wherein the connecting space 132 is also located at a connection of the inlet channel 11 and the outlet channel 12.

It is preferable that the second plug 104 includes four projections 144 extending from the peripheral top surface thereof and spaced apart from each other, each two adjacent projections 144 is used to define the recess 143, and between the projection 144 and the first groove 15 of the body 101 is formed a circular path 145 so that each two second holes 142 are in communication with each other.

The first bore 16 of the first plug 103 is comprised of a first conical aperture 161 and a second conical aperture 162 and is formed in a step shape, wherein a diameter of the second conical aperture 162 is less than that of the first conical aperture 161, an outlet end of the second conical aperture 162 is an outlet end of the first bore 16 as well.

The second bore 17 of the second plug 104 is comprised of an equal-diameter orifice 171 and a third conical aperture 172; an inlet end of the third conical aperture 172 is an inlet end of the second bore 17 as well, and a diameter of the second bore 17 is more than that of the second conical aperture 162 of the first plug 103.

The first plug 103 includes a second groove 133 disposed thereon and corresponding to the through channel 13 so as to retain with the valve member 10b, and the first and the second plugs 103, 104 include two positioning notches 134 fixed on outer surfaces thereof respectively to retain with two seal rings 135, such that the first and the second plugs 103, 104 engage with the first groove 15 of the body 101 tightly.

The valve member 10b is installed in the through channel 13 and includes a flexibly circular wing 181 formed therein to abut against and close the through channel 13 so that the intakes 14 are stopped communicating with the inlet channel 11 and the outlet channel 12, and when a vacuum attraction generates in the through channel 13, the inlet and the outlet channels 11, 12 are opened.

The valve member 10b includes a fitting portion 182 retained in the second groove 133 of the first plug 103 and the wing 181 extending from the fitting portion 182; a cross section of the valve member 10b is formed in a V shape, and the valve member 10b is made of a rubber or a silica gel material to obtain an inward retracting deformation and outward expending force.

Figure 7:
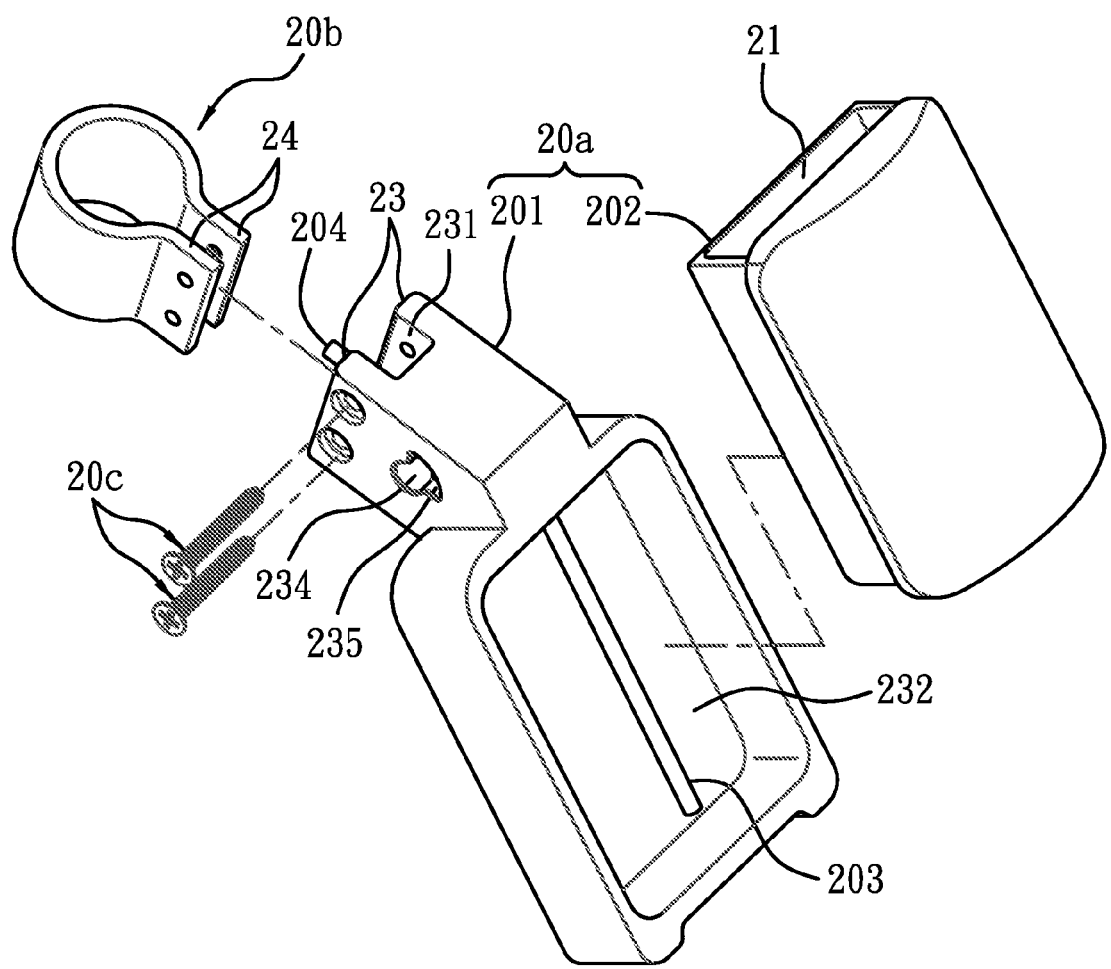
FIG. 7 is a perspective view showing the exploded components of a storing unit of the cleaning water supply device in accordance with the first embodiment of the present invention.
Figure 10:
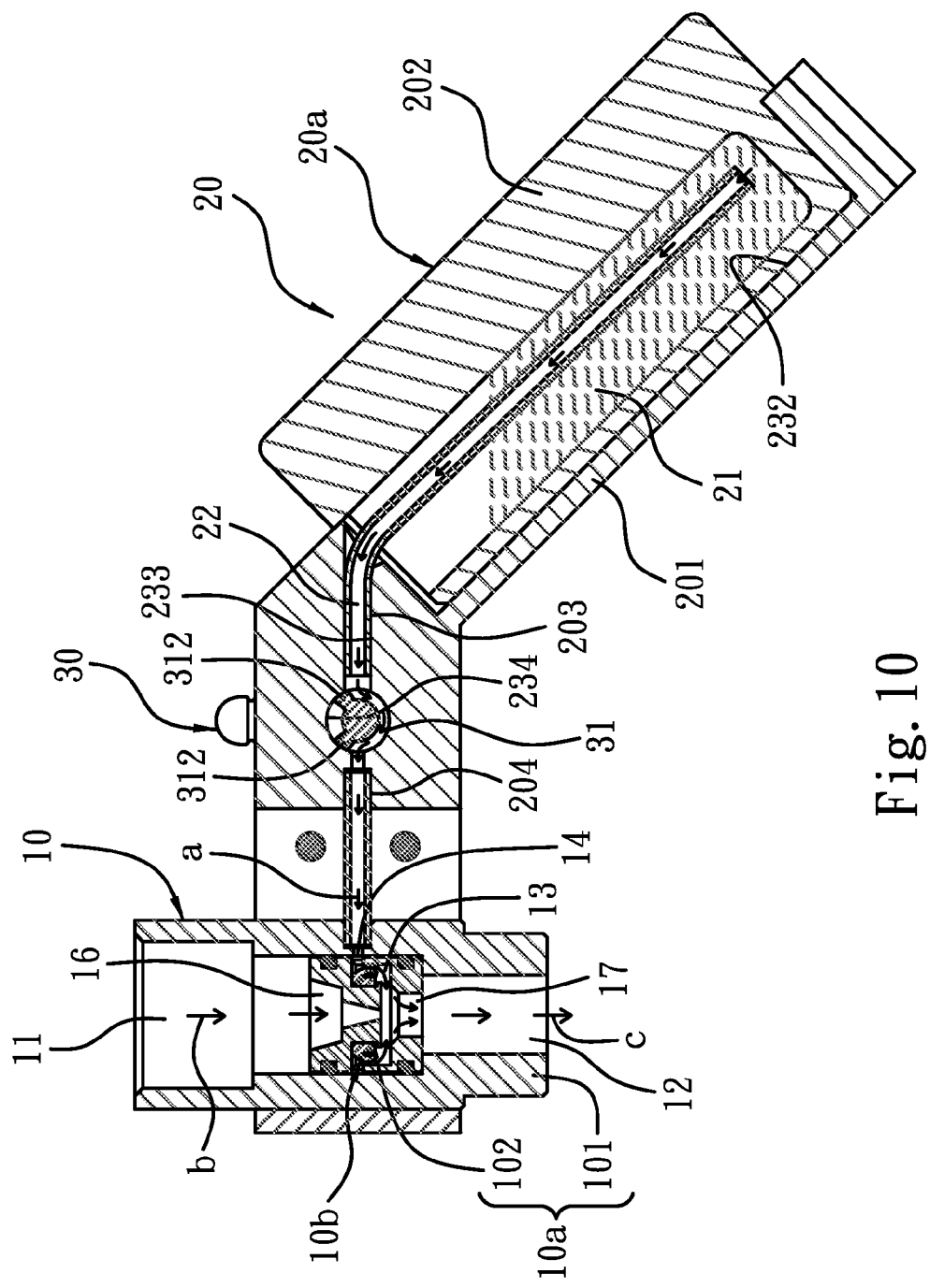
FIG. 10 is a cross-sectional view showing the operation of the cleaning water supply device in accordance with the first embodiment of the present invention.
Figure 11:
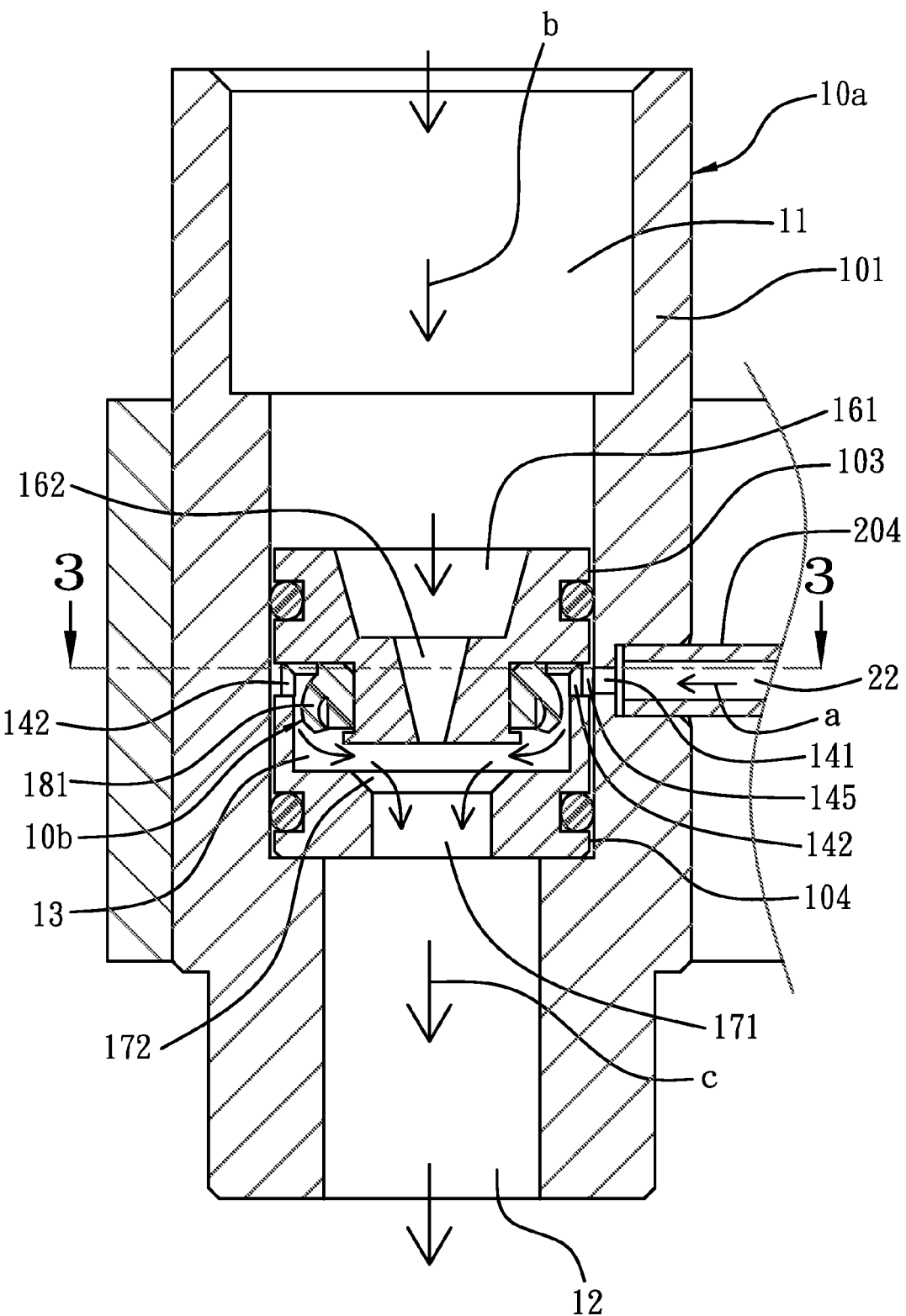
FIG. 11 is another cross-sectional view showing the operation of the cleaning water supply device in accordance with the first embodiment of the present invention.
Figure 12:
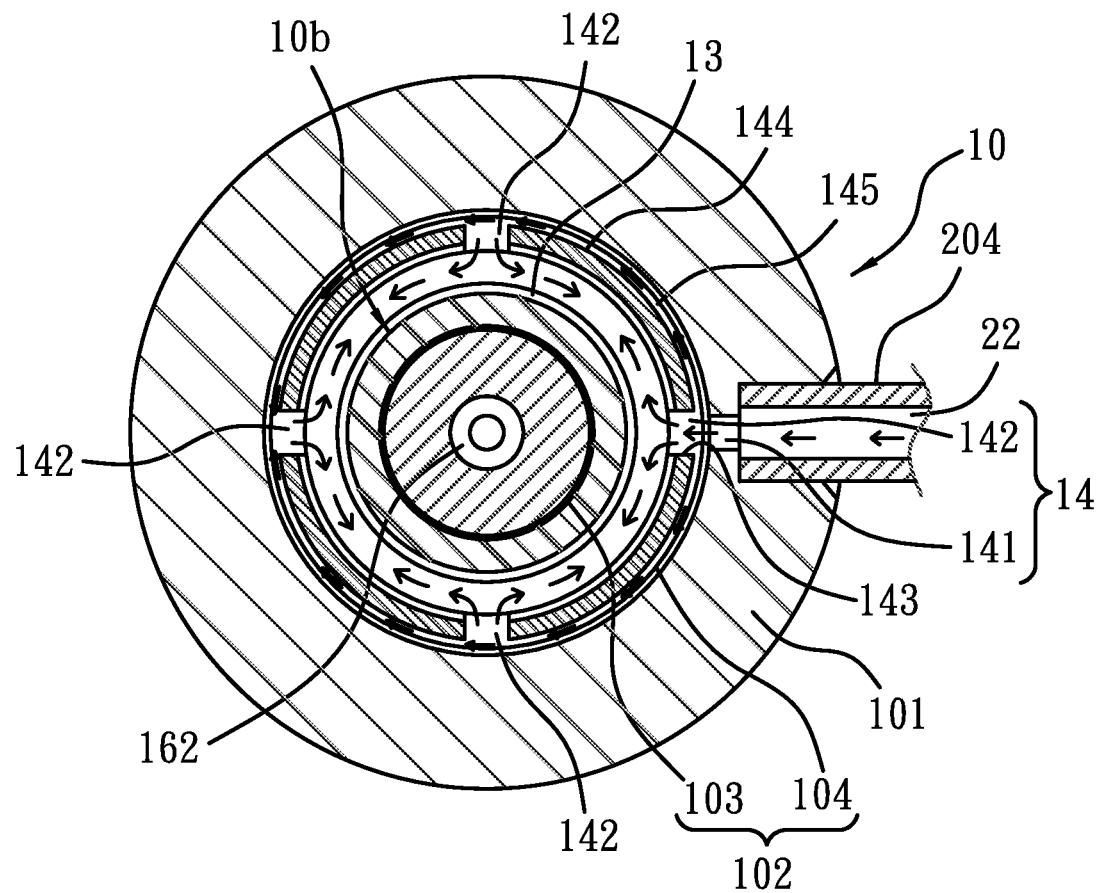
FIG. 12 is a cross-sectional view taken along the line 3-3 of FIG. 11.

The storing unit 20 as illustrated in FIG. 7, is connected with the channel assembly 10a of the mixing unit 10 and includes a chamber 21 to receive a cleaning fluid and an output tunnel 22 communicating with the chamber 21 and the intake 14, thus flowing the cleaning fluid outward; the cleaning fluid a in the chamber 21 is drawn into the connection of the inlet channel 11 and the outlet channel 12 along the output tunnel 22, the intake 14, and the through channel 13 after the through channel 13 are turned on as shown in FIGS. 10-12, thereafter the cleaning fluid mixes with a water flow b to form a cleaning water c.

The cleaning fluid a is selected from soap fluid, shower gel, and shampoo.

The storing unit 20 includes a store box 20a, an engaging member 20b, and two locking components 20c, wherein the store box 20a includes the chamber 21, the output tunnel 22, and two opposite first tabs 23 between which is defined an installing room 231.

The store box 20a further includes a seat 201, a cover 202, a first convey tube 203, and a second convey tube 204.

The seat 201 is provided to be the first tabs 23 and includes a first slot 232 and a passage 233 communicating with the first slot 232 and the installing room 231, the passage 233 of the seat 201 includes a third bore 234 secured on a middle section thereof. It is preferably that a diameter of the third bore 234 is more than that of the passage 233, but the diameter of the third bore 234 is capable of being equal to that of the passage 233. The seat 201 also includes a second slot 235 formed on an outer surface thereof.

The cover 202 is removably fixed in the first slot 232 of the seat 201 and is applied to define the chamber 21, wherein an opening of the chamber 21 corresponds to one end of the passage 233 of the seat 201.

One end of the first convey tube 203 is inserted into the one end of the passage 233 of the seat 201 corresponding to the opening of the chamber 21, and another end of the first convey tube 203 is received in the chamber 21.

One end of the second convey tube 204 is inserted into another end of the passage 233 of the seat 201 corresponding to the installing room 231, and another end of the second convey tube 204 is inserted into the first hole 141 of the body 101 of the channel assembly 10a; the first convey tube 203, the second convey tube 204, and the passage 233 between the first and the second convey tubes 203, 204 are used to define the output tunnel 22.

The seat 201 includes an air inlet (not shown) arranged thereon and corresponding to the opening of the chamber 21 so as to flow air, such that the cleaning fluid in the chamber 21 is drawn into the output tunnel 22.

The engaging member 20b is retained with an outer surface of the channel assembly 10a and includes two opposite second tabs 24 inserted in the installing room 231 of the store box 20a.

In this embodiment, the locking component 20c is a first bolt to be inserted through the first and the second tabs 23, 24 and is screwed with one of the first tabs 23 so as to be moved to contact with another first tab 23, hence the engaging member 20b is fixed on the channel assembly 10a.

Figure 8:
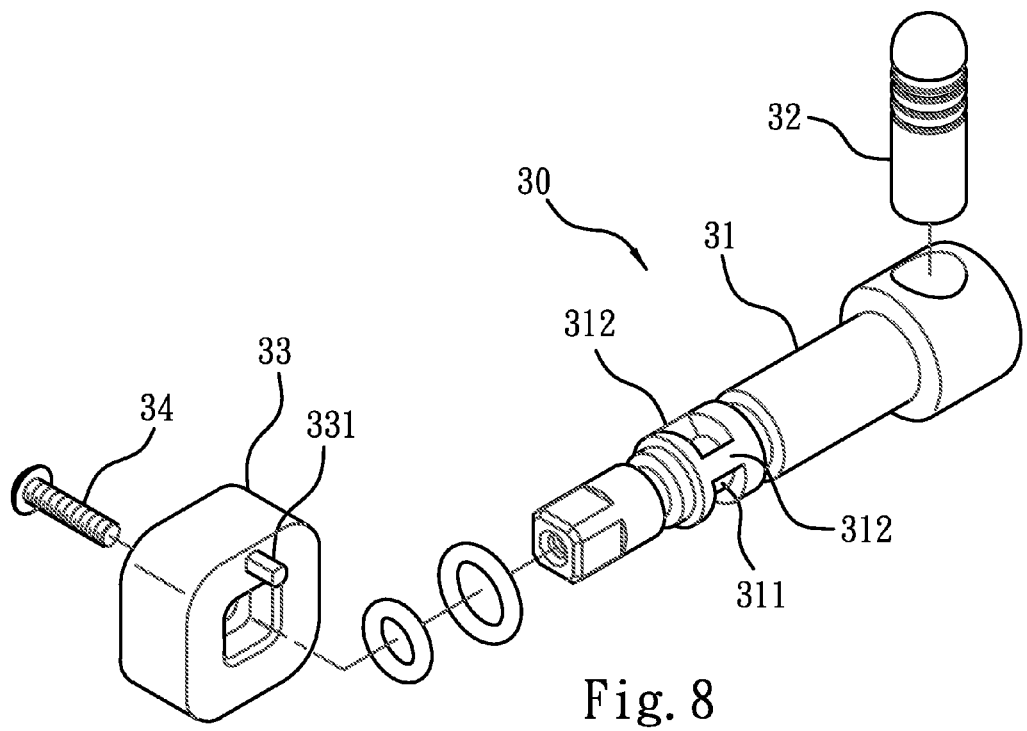
FIG. 8 is another perspective view showing the exploded components of a storing unit of the cleaning water supply device in accordance with the first embodiment of the present invention
Figure 9:
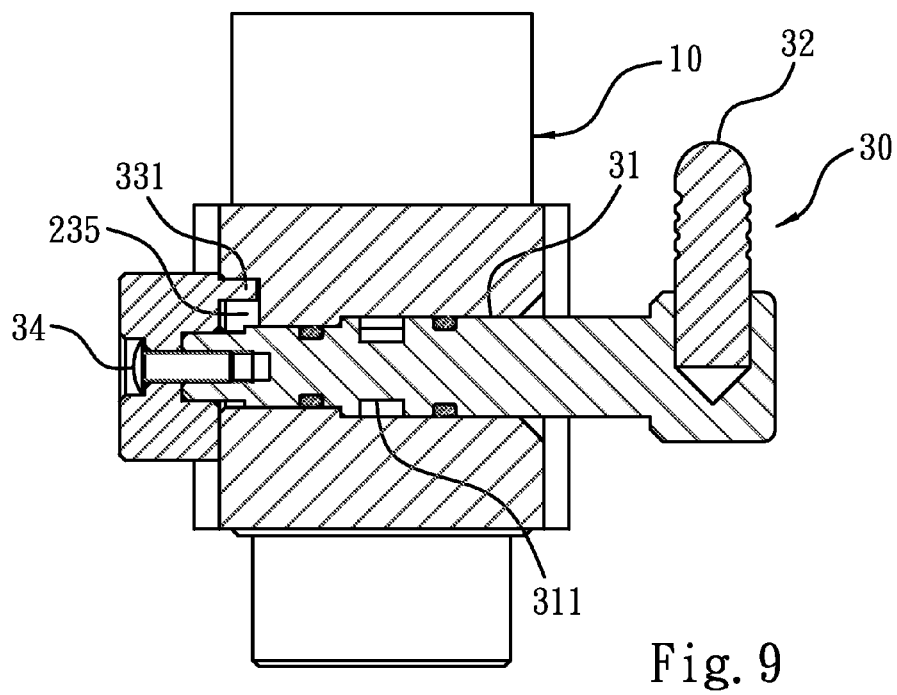
FIG. 9 is a cross-sectional view taken along the line 2-2 of FIG. 1.

The control unit 30, as illustrated in FIGS. 8 and 9, is installed on the storing unit 20 to be shifted to control the output tunnel 22 of the storing unit 20 to output the cleaning fluid.

Figure 13:
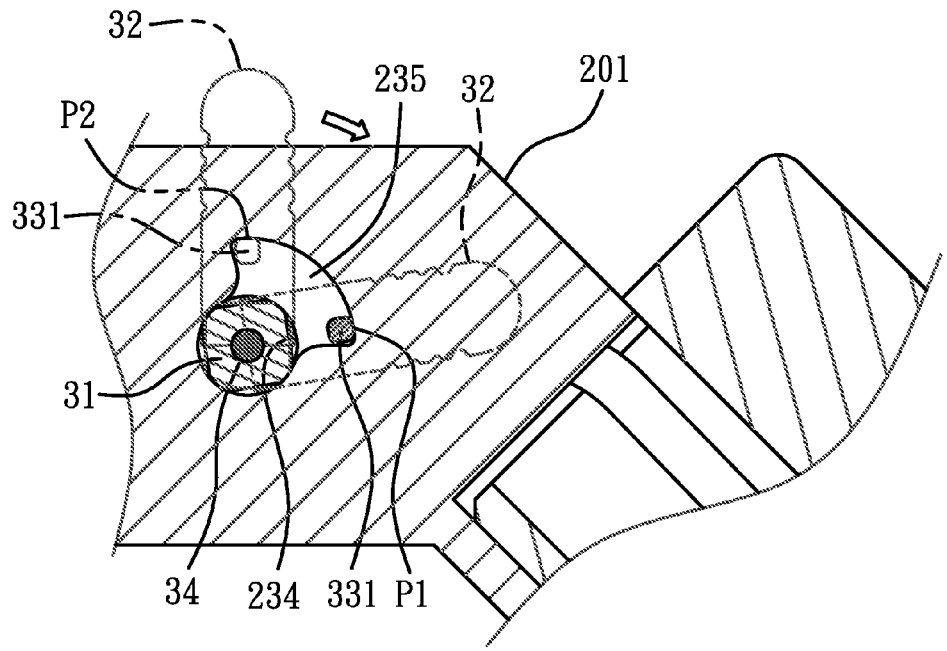
FIG. 13 is another cross-sectional view showing the operation of the cleaning water supply device in accordance with the first embodiment of the present invention.
Figure 14:
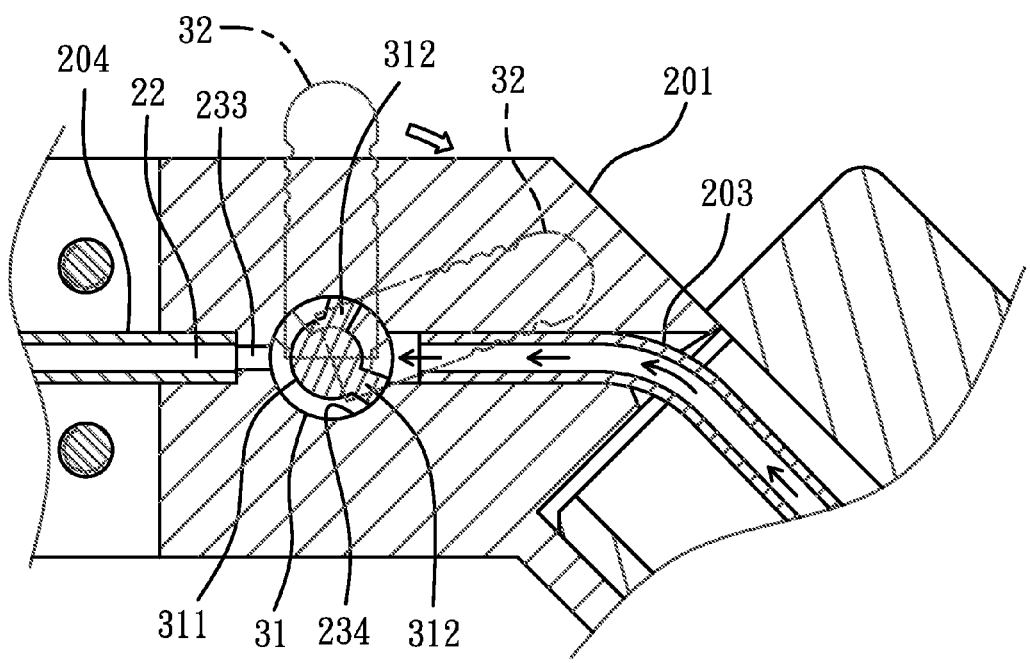
FIG. 14 is also another cross-sectional view showing the operation of the cleaning water supply device in accordance with the first embodiment of the present invention.

The control unit 30 further includes a valve core 31 passing through the third bore 234 of the seat 201, an operating bar 32 disposed on one end of the valve core 31 to drive the valve core 31, a limit block 33 secured on another end of the valve core 31; wherein the valve core 31 includes a small-diameter stem segment 311 formed thereon and corresponding to the passage 233 of the seat 201, and the stem segment 311 includes two spaced close portion 312 extending from an outer surface of the stem segment 311 to rotate with the valve core 31 so as to close the third bore 234; the limit block 33 is inserted by a second bolt 34 to screw with the valve core 31 so as to be further fixed on the seat 201 with the valve core 31, and the limit block 33 also includes a positioning peg 331 disposed on an inner surface thereof to be received in the second slot 235 of the seat 201 and to rotate between a first position P1 and a second position P2 of the second slot 235 as illustrated in FIG. 13; when the positioning peg 331 is located at the first position P1, the output tunnel 22 is closed by the close portion 312 of the valve core 31 as shown in FIG. 14; and when the positioning peg 331 is located at the second position P2, the close portion 312 of the valve core 31 is rotated to turn on the output tunnel 22 as illustrated in FIG. 10.

The cleaning water supply device 1 is fixed onto a water supply pipe, wherein when the water supply pipe is not tuned on, the wing 181 of the valve member 10b of the mixing unit 10 abuts against the through channel 13 as shown in FIG. 4 to close the through channel 13.

While the water supply pipe is tuned on, the water flow b flows outward from the inlet channel 11 of the mixing unit 10 via the through channel 13 and the outlet channel 12 as shown in FIGS. 10 and 11. It is to be noted that because a diameter of the first bore 16 of the inlet channel 11 becomes decreased along a water flowing direction, and the diameter of the second bore 17 is more than that of the outlet end of the first bore 16 so that a connection of the first and the second bores 16, 17 forms a smallest flowing cross section, when water flows through the smallest cross section, a low pressure and a high flowing speed generate to obtain a largest vacuum according to the venturi principle so that the vacuum attraction generates on the connection of the inlet and the outlet channels 11, 12, hence the wing 181 of the valve member 10b is retracted inward flexibly by the vacuum attraction to open and guide the through channel 13. In the meantime, the output tunnel 22 of the storing unit 20 is turned on by using the control unit 30 to draw the cleaning fluid a of the chamber 21 into the connection of the inlet and the outlet channels 11, 12 via the output tunnel 22, the intake 14, and the through channel 13 so that the cleaning fluid a mixes with the water flow b, thereby obtaining the cleaning water c.

As the output tunnel 22 of the storing unit 20 is turned off by ways of the control unit 30 as illustrated in FIGS. 13 and 14 to stop supplying the cleaning fluid a, the mixing unit 10 supplies the water flow b once more.

The output tunnel 22 is controlled by manually operating the operating bar 32 of the control unit 30, and due to the positioning peg 331 of the limit block 33 only rotates between the first and the second positions P1, P2 of the second slot 235 as shown in FIG. 13, the operating bar 32 is merely shifted between an turning-on and an turning-off positions as illustrated in FIG. 14. When the operating bar 32 is rotated toward the turn-on position, the positioning peg 331 is limited at second position P2, and the close portion 312 of the valve core 31 is rotated to turn on the output tunnel 22 so that the cleaning fluid flows outward. While the operating bar 32 is rotated toward the turn-off position, the positioning peg 331 is limited at first position P1, and the close portion 312 of the valve core 31 stops the output tunnel 22 so that the cleaning fluid can not flow outward, thereby starting and stopping a supply of the cleaning fluid easily and quickly.

It is to be noted that the intake 14 is comprised of one of the first holes 141 of the body 101 and the four second holes 142, and the second holes 142 are in communication with the path 145 as illustrated in FIG. 12; thereby partial cleaning fluid flows into the annular space 131 of the through channel 13 from one of the second holes 142, and another partial cleaning fluid flows into the annular space 131 of the through channel 13 from the other three second holes 142 along the path 145 in turn so that the cleaning fluid flows into the annular space 131 completely to mix with the water flow quickly and evenly.

Because each second hole 142 communicates with the first hole 141 through the path 145, if anyone second hole 142 does not correspond to the first hole 141, the cleaning fluid still can flow into the through channel 13 equally and efficiently. In addition, the plug member 102 is fixed in the first groove 15 of the body 101 easily and quickly.

The quantity of the first hole 141 and the second hole 142 is not be limited as described in this embodiment.

The cleaning water supply device 1 draws the cleaning fluid automatically by using the vacuum attraction so that the cleaning fluid mixes with the water flow. Also, the wing 181 of the valve member 10b allows to deform to further control the through channel 13.

For example, when a water pressure of the mixing unit 10 becomes lower, the vacuum attraction in the through channel 13 will be lowered, accordingly an inward retracting deformation of the wing 181 becomes decreased to lower an open cross-section area of the through channel 13, such that the vacuum attraction generates a great influence so that the cleaning fluid is attracted into the water flow well at a lower water pressure.

Due to the open cross-section area of the through channel 13 is adjusted with a change of the water pressure, when the water pressure decreases to lower the open cross-section area, the cleaning fluid is outputted decreasingly, while the water pressure increases to enhance the open cross-section area, the cleaning fluid is outputted increasingly so that the cleaning fluid and the water flow are mixed together within a certain range, thus achieving a suitable concentration of the cleaning water.

A difference of a cleaning water supply device 1 of a second embodiment of the present invention from that of the first embodiment comprises:

a shower component 40 screwed on an outlet end of a body 101 of the channel assembly 10a and including a knob head 41 and a spraying set 42 fixed on the knob head 41 to adjust a showering angle so that the cleaning water supply device 1 is used in the showering equipment. When taking a shower, an output tunnel 22 is turned on to spray cleaning water, and then the output tunnel 22 is turned off to spray showering water.

Figure 15:
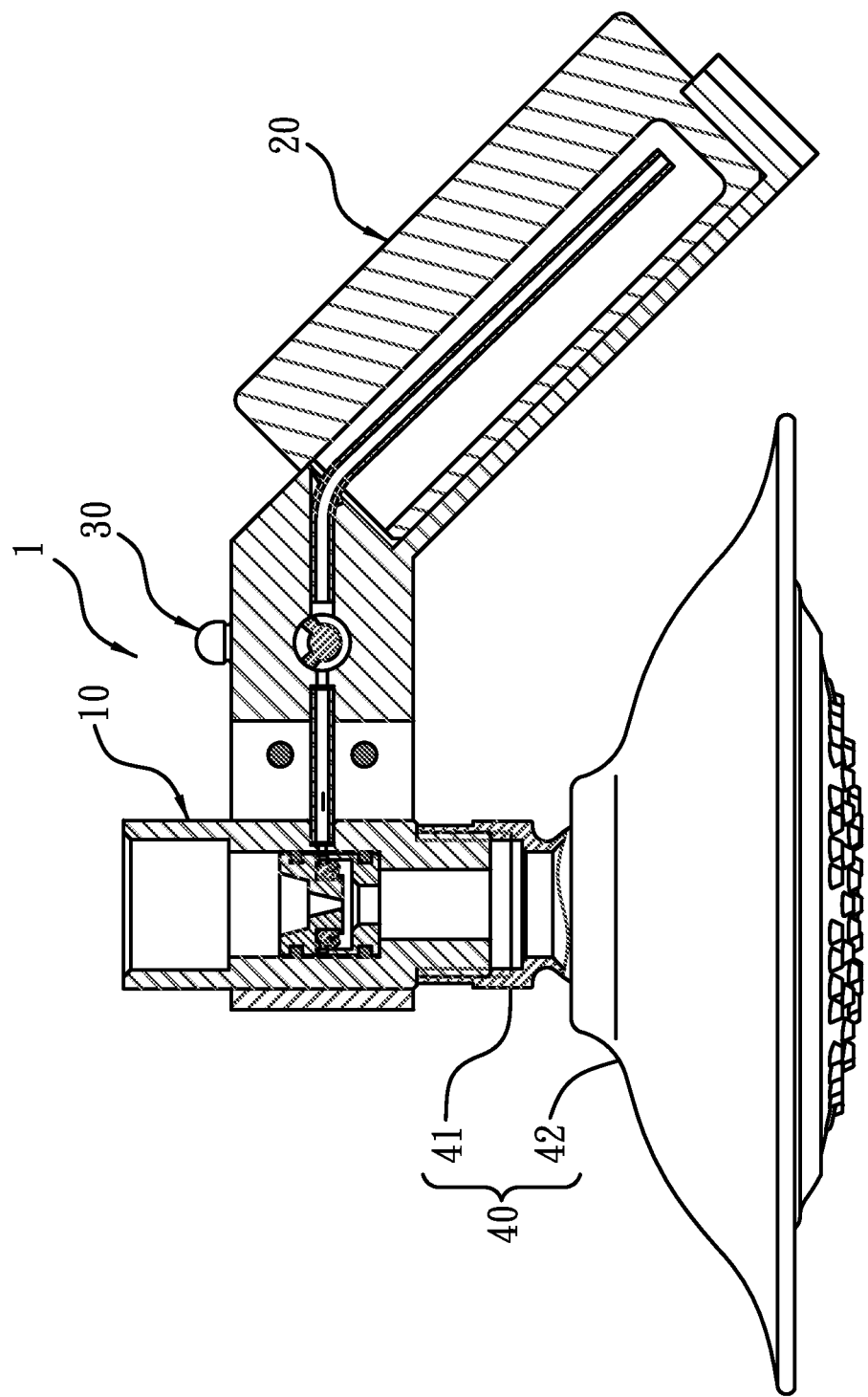
FIG. 15 is a cross-sectional view showing the application of a cleaning water supply device in accordance with a second embodiment of the present invention.

Referring to FIG. 15, as the showering equipment is adjusted in a water splash mode, the water pressure is changed to generate a back pressure in internal pipes of the showering equipment, and then a circular wing 181 of a circular valve member 10 senses the back pressure to further close a through channel 13 automatically so that a water flow or the cleaning fluid is stopped to flow back to the output tunnel 22 and a chamber 21, thus preventing the cleaning fluid from being contaminated. Likewise, impurities in the water is stopped to flow into the through channel 13 or an intake 14, thus preventing the through channel 13 or the intake 14 from being jammed by the impurities.

Figure 16:
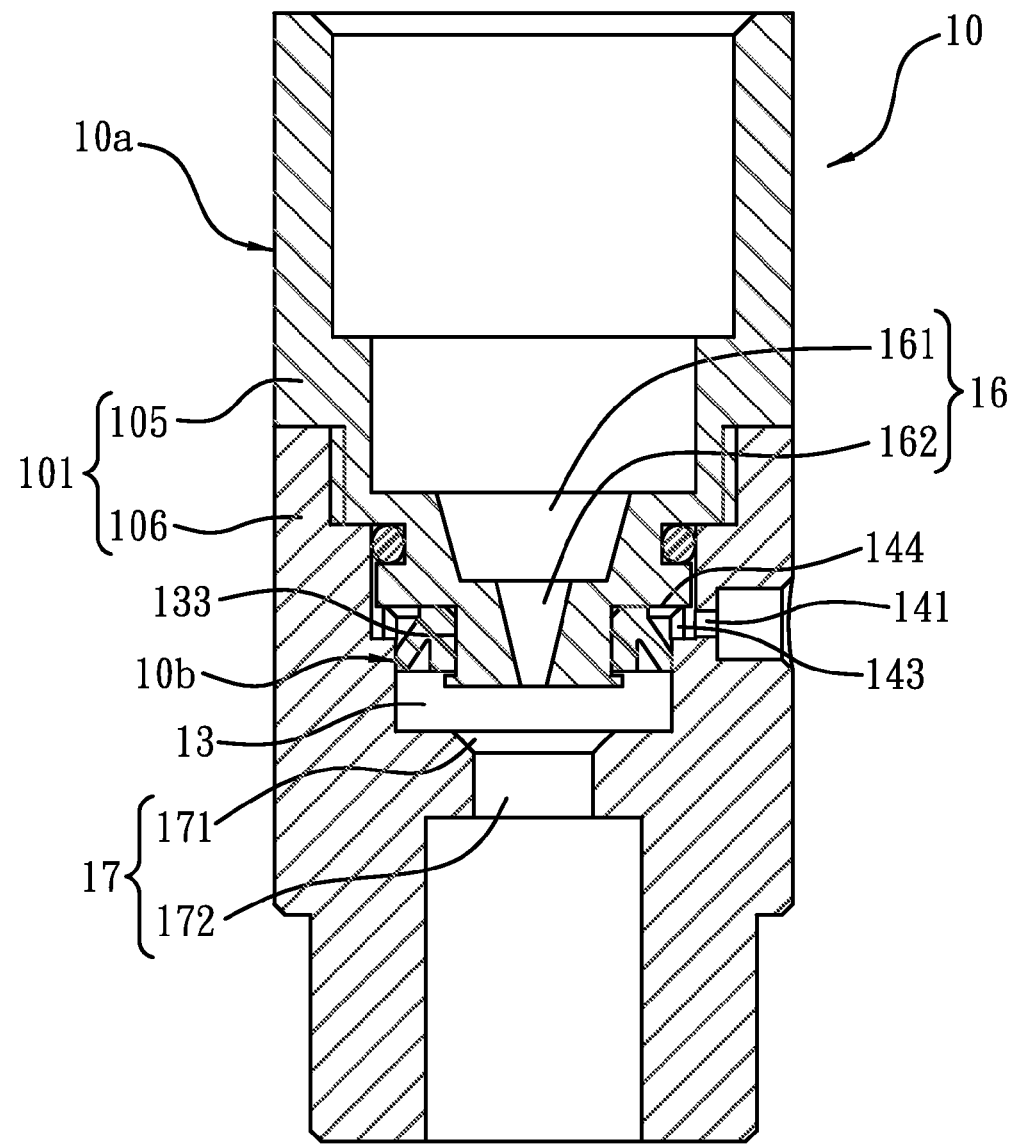
FIG. 16 is a cross-sectional view showing the assembly of a channel assembly of the cleaning water supply device in accordance with the second embodiment of the present invention.
Figure 17:
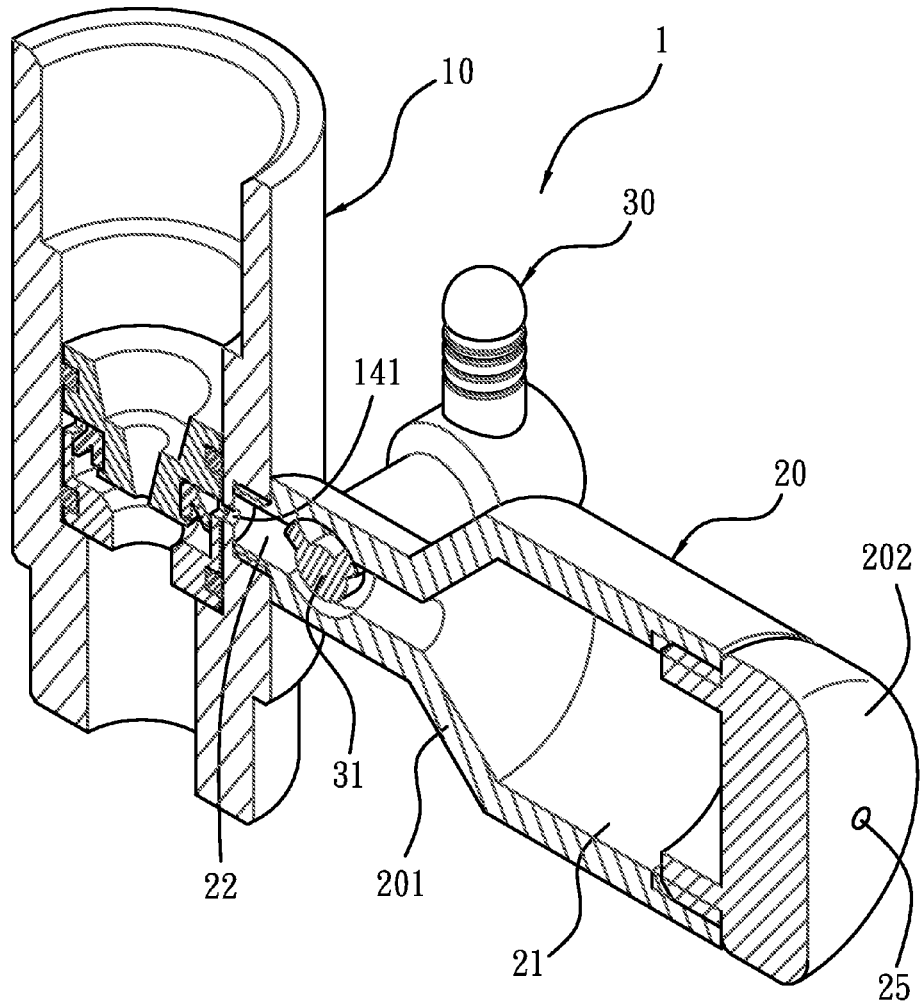
FIG. 17 is a cross-sectional perspective view showing the assembly of a cleaning water supply device in accordance with a third embodiment of the present invention.

With reference to FIG. 16, the channel assembly 10a of the first embodiment is comprised of the body 101, the first plug 103, and the second plug 104. But a first part member 105 and a second part member 106 are allowed to be screwed together to form the body 101, wherein the first part member 105 is integrally formed to generate a main structure of the first plug 103 which includes the first bore 16 and the second groove 133, and the second part member 106 is directly formed to generate a main structure of the second plug 104 which includes the second bore 17, the recess 143, and the projection 144. It is preferable that the second part member 106 is formed to obtain the first hole 141 of the body 101, thereby simplifying production process and lowering production cost.

A difference of a cleaning water supply device 1 of a third embodiment of the present invention from that of the first embodiment comprises:

a storing unit 30 only having the store box 20a without the engaging member 20b and the two locking components 20c of the first embodiment, and a seat 201 formed in a cylinder shape, a cover 202 retained with one end of the cover 201, and a cylindrical chamber 21 defined between the seat 201 and the cover 202.

The seat 201 includes an output tunnel 22 directly formed therein without having the first convey tube 203 and the second convey tube 204 of the first embodiment, a small-diameter tube segment formed on one end thereof in response to the cover 202, wherein the small-diameter tube segment includes the output tunnel 22 arranged therein, and a distal side of the tube segment is coupled with the first hole 141 of the mixing unit 10 in a quick removing or a screwing manner so that the storing unit 30 and the mixing unit 10 are connected together easily and quickly. In addition, a structure of the storing unit 30 is simplified to lower production cost.

The air inlet of the first embodiment to communicate with the chamber 21 is fixed on the seat 201, while an air inlet 25 of the third embodiment is secured on a suitable position of the cover 202 to feed air.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A cleaning water supply device comprising:
a mixing unit including a channel assembly and a circular valve member, wherein
the channel assembly includes an inlet channel, an outlet channel, a through channel between the inlet and the outlet channels, and at least one intake communicating with the through channel; when a water flow flows into the outlet channel from the inlet channel, a vacuum attraction generates in the through channel;
the valve member is installed in the through channel and includes a flexibly circular wing formed therein to abut against and close the through channel so that the intake is stopped communicating with the inlet channel and the outlet channel, and when the vacuum attraction generates in the through channel, the inlet and the outlet channels are opened;
a storing unit connected with the channel assembly of the mixing unit and including a chamber to receive a cleaning fluid and an output tunnel communicating with the chamber and the intake, thus flowing the cleaning fluid outward; the cleaning fluid in the chamber being drawn into a connection of the inlet channel and the outlet channel along the output tunnel, the intake, and the through channel after the water are turned on, thereafter the cleaning fluid mixing with the water flows to form a cleaning water;
wherein the channel assembly includes a body and a plug member; the body is provided to define one part of the inlet channel, one part of the outlet channel, and one first hole to define one part of the intake and a first groove; the plug member is installed in the first groove of the body to define the through channel, one part of the inlet channel, one part of the outlet channel, and at least one second hole, the second hole and the first holes are combined to define the intake;
wherein the plug member includes a first plug and a second plug, both of which are fixed in the first groove of the body; the first plug includes a first bore axially passing therethrough to define one part of the inlet channel; the second plug includes a second bore axially passing therethrough to define one part of the outlet channel and at lease one recess formed on a peripheral top surface thereof to define the intake with the first plug; between the first plug and the second plug is defined the through channel;
wherein the second plug includes a plurality of projections extending from the peripheral top surface thereof and spaced apart from each other, each two adjacent projections is used to define the recess, and between the projection and the first groove of the body is formed a circular path so that each two second holes are in communication with each other.

2. The cleaning water supply device as claimed in claim 1, wherein the second bore of the second plug is comprised of an equal-diameter orifice and a third conical aperture; an inlet end of the third conical aperture is an inlet end of the second bore.

3. The cleaning water supply device as claimed in claim 1, wherein the first and the second plugs include two positioning notches fixed on outer surfaces thereof respectively to retain with two seal rings, such that the first and the second plugs engage with the first groove of the body tightly.

4. The cleaning water supply device as claimed in claim 1, wherein the through channel includes an annular space and a connecting space located at a bottom end of the annular space, the valve member is received in the annular space, and the connecting space is also located at the connection of the inlet channel and the outlet channel.

5. The cleaning water supply device as claimed in claim 1 further comprising a shower component screwed on an outlet end of the channel assembly.

6. The cleaning water supply device as claimed in claim 1, wherein the valve member is made of a flexible material.

7. The cleaning water supply device as claimed in claim 6, wherein the flexible material of the valve member is selected from a rubber and a silica gel material.

8. The cleaning water supply device as claimed in claim 1, wherein the first bore of the first plug is comprised of a first conical aperture and a second conical aperture and is formed in a step shape, and a diameter of the second conical aperture is less than that of the first conical aperture, an outlet end of the second conical aperture is an outlet end of the first bore; and a diameter of the second bore is more than that of the second conical aperture of the first plug.

9. The cleaning water supply device as claimed in claim 8, wherein the first plug includes a second groove disposed thereon and corresponding to the through channel so as to retain with the valve member.

10. The cleaning water supply device as claimed in claim 9, wherein the valve member includes a fitting portion retained in the second groove of the first plug and the wing extending from the fitting portion; a cross section of the valve member is formed in a V shape.

11. The cleaning water supply device as claimed in claim 1 further comprising a control unit installed on the storing unit to be shifted to control the output tunnel of the storing unit to output the cleaning fluid.

12. The cleaning water supply device as claimed in claim 11, wherein the control unit further includes a valve core passing through the third bore of the seat, an operating bar disposed on one end of the valve core to drive the valve core, a limit block secured on another end of the valve core; the valve core includes a stem segment formed thereon and corresponding to the passage of the seat, and the stem segment includes two spaced close portions extending from an outer surface of the stem segment to rotate with the valve core so as to close the third bore, such that the output tunnel is closed or opened.

13. The cleaning water supply device as claimed in claim 12, wherein the seat also includes a second slot formed on an outer surface thereof and corresponding to the limit block; and the limit block includes a positioning peg disposed on an inner surface thereof to be received in the second slot of the seat and to rotate between a first position and a second position of the second slot when the positioning peg is located at the first position, the output tunnel is closed by the close portion of the valve core; and when the positioning peg is located at the second position, the close portion of the valve core is rotated to turn on the output tunnel.

14. The cleaning water supply device as claimed in claim 1, wherein the storing unit includes a store box, an engaging member, and two locking components, wherein the store box includes the chamber, the output tunnel, and two opposite first tabs between which is defined an installing room; the engaging member is retained with an outer surface of the channel assembly and includes two opposite second tabs inserted in the installing room of the store box; the locking component is inserted through the first and the second tabs and is screwed with one of the first tabs so as to be moved to contact with another first tab, hence the engaging member is fixed on the channel assembly.

15. The cleaning water supply device as claimed in claim 14, wherein the store box further includes a seat, a cover, a first convey tube, and a second convey tube; the seat is provided to be the first tabs and includes a first slot and a passage communicating with the first slot and the installing room; the cover is removably fixed in the first slot of the seat and is applied to define the chamber, wherein an opening of the chamber corresponds to one end of the passage of the seat; one end of the first convey tube is inserted into the one end of the passage of the seat corresponding to the opening of the chamber, and another end of the first convey tube is received in the chamber; one end of the second convey tube is inserted into another end of the passage of the seat corresponding to the installing room, and another end of the second convey tube is inserted into the first hole of the body of the channel assembly; the first convey tube, the second convey tube, and the passage between the first and the second convey tubes are used to define the output tunnel.

16. The cleaning water supply device as claimed in claim 15, wherein the passage of the seat includes a third bore secured on a middle section thereof, and a diameter of the third bore is more than that or equal to of the passage.

* * * * *